United States Patent
Hofmann et al.

(10) Patent No.: US 6,482,993 B1
(45) Date of Patent: Nov. 19, 2002

(54) METHOD FOR PRODUCING LONG CHAIN POLYETHER POLYOLS WITHOUT REPROCESSING

(75) Inventors: Jörg Hofmann, Krefeld (DE); Pramod Gupta, Bedburg (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/673,583

(22) PCT Filed: Apr. 8, 1999

(86) PCT No.: PCT/EP99/02397

§ 371 (c)(1),
(2), (4) Date: Oct. 18, 2000

(87) PCT Pub. No.: WO99/54383

PCT Pub. Date: Oct. 28, 1999

(30) Foreign Application Priority Data

Apr. 21, 1998 (DE) .......................... 198 17 676

(51) Int. Cl.⁷ ..................... C07C 43/11; C07C 43/18; C07C 43/20; C07H 15/04
(52) U.S. Cl. ..................... 568/616; 568/618; 568/619; 536/120
(58) Field of Search ............... 568/616, 618, 568/619

(56) References Cited

U.S. PATENT DOCUMENTS

| 3,404,109 A | 10/1968 | Milgrom | 260/611 |
|---|---|---|---|
| 3,715,402 A | 2/1973 | Louvar et al. | 260/613 B |
| 3,829,505 A | 8/1974 | Herold | 260/611 B |
| 3,941,849 A | 3/1976 | Herold | 260/607 A |
| 4,137,398 A | 1/1979 | Muzzio | 536/4 |
| 4,430,490 A | 2/1984 | Doerge | 528/77 |
| 4,507,475 A | 3/1985 | Straehle et al. | 536/120 |
| 5,158,922 A | 10/1992 | Hinney et al. | 502/175 |
| 5,545,601 A | 8/1996 | Le-Khac | 502/156 |
| 5,627,120 A | 5/1997 | Le-Khac | 502/156 |

FOREIGN PATENT DOCUMENTS

| DE | 197 45 120 | 4/1999 |
|---|---|---|
| DE | 197 57 574 | 6/1999 |
| EP | 0700949 | 3/1996 |
| EP | 9855417 | 7/1998 |
| WO | 95/02625 | 1/1995 |
| WO | 96/13540 | 5/1996 |
| WO | 99/46042 | 9/1999 |

*Primary Examiner*—Samuel Barts
*Assistant Examiner*—Michael C. Henry
(74) *Attorney, Agent, or Firm*—Joseph C. Gil; Carolyn M. Sloane

(57) ABSTRACT

This invention relates to a process for the production of long-chain polyether polyols without working up, in which oligomeric, alkoxylated starter compounds having molecular weights of 200 to 1000 are first obtained by catalysis with perfluoroalkylsulfonates of the metals of group III A of the periodic system of elements (in accordance with the IUPAC convention of 1970) from low molecular weight starters by reaction with alkylene oxides at reaction temperatures of 80 to 200° C. and catalyst concentrations of 5 to 200 ppm, which oligomeric, alkoxylated starter compounds are then converted without working up and removal of the catalyst by means of highly active DMC catalysts at a catalyst concentration of 30 ppm or below, relative to the quantity of polyether polyol to be produced, by reaction with alkylene oxides into higher molecular weight, long-chain polyether polyols.

8 Claims, No Drawings

METHOD FOR PRODUCING LONG CHAIN POLYETHER POLYOLS WITHOUT REPROCESSING

This is the National phase Application of PCT/EP99/02397, field Apr. 8, 1999.

This invention relates to a process for the production of long-chain polyether polyols without working up.

Polyether polyols are obtainable by polyaddition of alkylene oxides, such as for example ethylene oxide, propylene oxide, butylene oxide, onto compounds containing active hydrogen atoms, such as alcohols, amines, acid amides, phenols, and are used inter alia for the production of polyurethane plastics, surfactants and lubricants. Polyaddition of epoxides onto starter compounds is conventionally performed industrially by alkali metal catalysis. The predominantly used alkali metal catalysts are alkali metal hydroxides. Disadvantages of alkali metal hydroxide catalysed polyether polyol production are primarily the elaborate working up of the product due to neutralisation of the alkaline polymer (c.f. for example U.S. Pat. No. 3,715,402, U.S. Pat. No. 4,430,490, U.S. Pat. No. 4,507,475 and U.S. Pat. No. 4,137,398) and the base-catalysed rearrangement of epoxides, for example propylene oxide, which proceeds as a secondary reaction, to yield allyl or propenyl alcohols, which give rise to monofunctional polyethers having a terminal double bond, which are known as monools.

One method known for the reduction of the monool content in the polyether polyols is to use double metal cyanide (DMC) complex compounds as catalysts for the polyaddition of epoxides onto starter compounds (c.f. for example U.S. Pat. No. 3,404,109, U.S. Pat. No. 3,829,505, U.S. Pat. No. 3,941,849 and U.S. Pat. No. 5,158,922). The polyether polyols obtained in this manner may be processed to yield high grade polyurethanes (for example elastomers, foams, coatings).

EP 700 949, EP 761 708, WO 97/40086 and DE-A 197 45 120.9, 197 57 574.9 and 198 102 269.0 disclose improved DMC catalysts which allow a further reduction in the fraction of monofunctional polyethers having terminal double bonds in the production of polyether polyols. The improved DMC catalysts are extraordinarily highly active and allow the production of polyether polyols at such low catalyst usage rates (25 ppm or below) that it is no longer necessary to separate the catalyst from the polyol (c.f. for example page 5, lines 24–29 in EP 700 949).

One disadvantage of using DMC catalysts for the production of polyether polyols is that these catalysts usually require an induction period. Unlike alkali metal catalysts, DMC catalysts do not start epoxide polymerisation immediately once the epoxide and starter compound have been added to the catalyst. The DMC catalyst must first be activated by a small quantity of epoxide. Induction periods are typically of a duration of some minutes to several hours.

Another disadvantage is that conventional, low molecular weight starter compounds for alkali metal catalysed polyether polyol synthesis, such as for example propylene glycol, glycerol or trimethylolpropane, cannot be alkoxylated with DMC catalysts. DMC catalysts thus require the use of oligomeric, alkoxylated starter compounds (for example a propoxylated propylene glycol or glycerol) having molecular weights of above 200, which have previously been obtained from the above-stated low molecular weight starters by, for example, conventional alkali metal catalysis (for example KOH catalysis) and subsequent elaborate working up by neutralisation, filtration and dehydration. Problematically, even very small residual quantities of alkali metal catalyst in the alkoxylated starter compounds can deactivate the DMC catalyst, such that a further additional, time-consuming working up stage (for example treatment with an ion exchanger or adsorbent) is necessary in order to ensure complete removal of the alkali metal catalyst from the alkoxylated starter compound.

The object of the present invention is accordingly to provide a process for production of long-chain polyether polyols without working up, in which oligomeric, alkoxylated starter compounds are first obtained from the low molecular weight starter compound (for example propylene glycol or trimethylolpropane) by an alternative catalysis to the conventional alkali metal catalysis, which oligomeric, alkoxylated starter compounds may then directly, i.e. without working up or removal of the catalyst, be further extended to yield long-chain polyether polyols by means of highly active DMC catalysts at very low catalyst usage rates (30 ppm or below).

German patent application No. 197 02 787.3 describes a process for the production of polyether polyols by catalysis with perfluoroalkyl-sulfonic acid salts (perfluoroalkylsulfonates) of the metals of group III A of the periodic system of elements (in accordance with the TUPAC convention of 1970).

It has surprisingly now been found that oligomeric, alkoxylated starter compounds having molecular weights of between 200 and 1000, which have been obtained by the metal perfluoroalkylsulfonate catalysts described in the above-stated German patent application from conventional, low molecular weight starters, such as for example propylene glycol or trimethylolpropane, by reaction with alkylene oxides at reaction temperatures of 80 to 200° C. and catalyst concentrations of 5 to 200 ppm, relative to the quantity of the oligomeric, alkoxylated starter compound to be produced, may be converted directly, i.e. without working up and removal of the catalyst, by means of highly active DMC catalysts at very low catalyst usage rates (30 ppm or below) by reaction with alkylene oxides into higher molecular weight, long-chain polyether polyols. It this manner, long-chain polyether polyols may be produced entirely without working up.

It was also found that when the alkoxylated starter compounds obtained by catalysis with the metal perfluoroalkylsulfonates are used, the induction and alkoxylation times on DMC catalysis are distinctly reduced in comparison with the use of corresponding oligomeric starter compounds, which were produced by alkali metal catalysis and conventional working up.

By shortening the cycle times in polyether polyol production, reduced induction and alkoxylation times also improve the economic viability of the process.

The present invention accordingly provides a process for the production of long-chain polyether polyols without working up, in which oligomeric, alkoxylated starter compounds having molecular weights of 200 to 1000 are first obtained by catalysis with perfluoroalkylsulfonates of the metals of group III A of the periodic system of elements (in accordance with the IUPAC convention of 1970) from low molecular weight starters by reaction with alkylene oxides at reaction temperatures of 80 to 200° C. and catalyst concentrations of 5 to 200 ppm, which oligomeric, alkoxylated starter compounds are then converted without working up and removal of the catalyst by means of highly active DMC catalysts at a catalyst concentration of 30 ppm or below, relative to the quantity of polyether polyol to be produced, by reaction with alkylene oxides into higher molecular weight, long-chain polyether polyols.

Catalysts used according to the invention for the production of the oligomeric, alkoxylated starter compounds are perfluoroalkylsulfonates of the metals of group III A of the periodic system of elements (in accordance with the TUPAC convention of 1970). This comprises the metals scandium, yttrium and the rare earth metals lanthanum, cerium, praseodymium, neodymium, promethium, samarium, europium, gadolinium, terbium, dysprosium, holmium, erbium, thulium, ytterbium and lutetium. A further metal which may be used is "mixed metal" (also known as "didymium"), a mixture of rare earth metals obtained from ore.

Perfluoroalkylsulfonates are taken to be metal salts of perfluoroalkylsufonic acids, in which the metal is at least attached to a perfluoroalkylsulfonate group. Other suitable anions may also be present. Preferred compounds, are the metal salts of trifluoromethanesulfonic acid, which are known as trifluoromethanesulfonates or triflates. The following are preferably used: scandium, yttrium, lanthanum, cerium, praseodymium, neodymium, samarium, europium, gadolinium, terbium, dysprosium, holmium, erbium, thulium, ytterbium and lutetium triflate.

The perfluoroalkylsulfonates may be used individually or as a mixture.

The alkylene oxides used are preferably ethylene oxide, propylene oxide, butylene oxide and the mixtures thereof. Synthesis of the polyether chains by alkoxylation may, for example, be performed with only one monomeric epoxide or alternatively also randomly or blockwise with 2 or 3 different monomeric epoxides. Propylene oxide is particularly preferably used.

The low molecular weight starters used are compounds having molecular weights of 18 to 400 and 1 to 8 hydroxyl groups. The following may be mentioned by way of example: ethylene glycol, diethylene glycol, triethylene glycol, 1,2-propylene glycol, dipropylene glycol, 1,4-butanediol, hexamethylene glycol, bisphenol A, trimethylolpropane, glycerol, pentaerythritol, sorbitol, cane sugar, degraded starch and water. The low molecular weight starters may be used individually or as a mixture.

The polyaddition catalysed by the metal perfluoroalkylsulfonates proceeds in the temperature range from 80 to 200° C., preferably in the range from 90 to 180° C., particularly preferably from 100 to 160° C., at total pressures of 0.001 to 20 bar. The process may be performed without solvent or in an inert organic solvent, such as for example toluene, xylene or THF. The quantity of solvent is conventionally 10 to 30 wt. %. The reaction is preferably performed without solvent.

The catalyst concentration is in the range from 5 to 200 ppm, preferably from 5 to 100 ppm, particularly preferably from 10 to 50 ppm, in each case relative to the quantity of the oligomeric, alkoxylated starter compound to be produced.

The reaction times for the polyaddition are in the range from a few minutes to several days.

The molecular weights of the oligomeric, alkoxylated starter compounds produced by the metal perfluoroalkylsulfonates are in the range between 200 and 1000 g/mol, preferably in the range between 200 and 800 g/mol.

The polyaddition process may be performed continuously, in a batch or semi-batch process.

The oligomeric, alkoxylated starter compounds produced according to the invention may be directly, i.e. without working up and removal of the catalyst, further extended by means of DMC catalysts to yield higher molecular weight, long-chain polyether polyols. Highly volatile fractions are preferably first removed from the oligomeric, alkoxylated starter compound by distillation under reduced pressure (0.01–100 mbar) and at elevated temperature (50–150° C.).

The two polyaddition stages may be performed separately (temporally and/or spatially, i.e. in different reaction vessels) or simultaneously as a so-called "single vessel reaction".

The highly active DMC catalysts to be used to produce the long-chain polyether polyols without working up from the oligomeric, alkoxylated starter compounds are known in principle and are comprehensively described, for example, in EP 700 949, EP 761 708, WO 97/40086 and in DE-A 197 45 120, 197 57 574 and 198 102 269.

The highly active DMC catalysts described in EP 700 949 which, apart from a double metal cyanide compound (for example zinc hexacyanocobaltate) and an organic complex ligand (for example tert-butanol), additionally contain a polyether having a number average molecular weight of greater than 500, are typical examples.

The alkylene oxides preferably used for the polyaddition are ethylene oxide, propylene oxide, butylene oxide and the mixtures thereof Synthesis of the polyether chains by alkoxylation may, for example, be performed with only one monomeric epoxide or alternatively also randomly or blockwise with 2 or 3 different monomeric epoxides. Further details may be found in *Ullmanns Encyclopädie der industriellen Chemie*, English language edition, 1992, volume A21, pp. 670–671. Propylene oxide is particularly preferably used.

The starters used according to the invention are oligomeric, alkoxylated starter compounds having 1 to 8 hydroxyl groups, which have previously been produced from the above-stated low molecular weight starters by means of catalysis by the metal perfluoroalkylsulfonates without removal of the catalyst, and which have molecular weights of between 200 and 1000 g/mol, preferably of between 200 and 800 g/mol. The oligomeric, alkoxylated starter compounds may be used individually or as a mixture.

The polyaddition, catalysed by the highly active DMC catalysts, of alkylene oxides onto oligomeric, alkoxylated starter compounds containing active hydrogen atoms generally proceeds at temperatures of 20 to 200° C., preferably in the range from 40 to 180° C., particularly preferably at temperatures of 50 to 150° C. The reaction may be performed at total pressures of 0.001 to 20 bar. Polyaddition may be performed without solvent or in an inert organic solvent, such as for example toluene, xylene or THF. The quantity of solvent is conventionally 10 to 30 wt. % relative to the quantity of the polyether polyol to be produced. The reaction is preferably performed without solvent.

The catalyst concentration is 30 ppm or below, preferably 25 ppm or below, particularly preferably 20 ppm or below, in each case relative to the quantity of the long-chain polyether polyol to be produced. The lowermost catalyst concentration is 0.1 ppm.

At these low catalyst concentrations, it is not necessary to work up the product. For use in polyurethane applications, it is possible to dispense with catalyst removal from the polyol without there being any negative impact on product quality.

The reaction times for the polyaddition are in the range from a few minutes to several days, preferably a few hours.

The molecular weights of the long-chain polyether polyols produced using the process according to the invention are in the range from 1000 to 100000 g/mol, preferably in the range from 1000 to 50000 g/mol, particularly preferably in the range from 2000 to 20000 g/mol.

Polyaddition may be performed continuously, in a batch or semi-batch process.

The highly active DMC catalysts generally require an induction time of a few minutes to several hours.

Using the oligomeric, alkoxylated starter compounds obtained according to the invention by catalysis with the metal perfluoroalkylsulfonates, brings about a distinct reduction (by approx. 25%) in the induction times on DMC catalysis, in comparison with the use of corresponding oligomeric, alkoxylated starter compounds which were produced by alkali metal catalysis and conventional working up (neutralisation, filtration, dehydration).

Simultaneously, using the oligomeric starter compounds produced by catalysis with the metal perfluoroalkylsulfonates, also substantially shortens the alkoxylation times on DMC catalysis (by approx. 50–60%).

This results in a shortening of the overall reaction times (sum of induction and alkoxylation times) of typically some 50%. In this manner, the shortening of cycle times in polyether polyol production improves the economic viability of the process.

EXAMPLES

Production of Highly Active DMC Catalyst (Synthesis According to EP 700 949).

A solution of 12.5 g (91.5 mmol) of zinc chloride in 20 ml of distilled water is added with vigorous stirring (24000 rpm) to a solution of 4 g (12 mmol) of potassium hexacyanocobaltate in 70 ml of distilled water. Immediately thereafter, a mixture of 50 g of tert.-butanol and 50 g of distilled water are added to the resultant suspension and then vigorously stirred for 10 minutes (24000 rpm). A mixture of 1 g of polypropylene glycol having an average molecular weight of 2000, 1 g of tert.-butanol and 100 g of distilled water is then added and stirred for 3 minutes (1000 rpm). The solid is isolated by filtration, then stirred for 10 minutes with a mixture of 70 g of tert.-butanol, 30 g of distilled water and 1 g of the above polyether (10000 rpm) and refiltered. The mixture is finally stirred once more for 10 minutes with a mixture of 100 g of tert.-butanol and 0.5 g of the above polyether (10000 rpm). After filtration, the catalyst is dried to constant weight at 50° C. and standard pressure.

Yield of dried, pulverulent catalyst: 6.23 g; Elemental analysis and thermogravimetric analysis: Cobalt=11.6%, zinc=24.6%, tert.-butanol=3.0%, polyether=25.8%.

Example 1

Stage A
Production of Oligomeric, Propoxylated Starter Compound by Means of Yttrium Triflate Catalysis 1839 g of trimethylolpropane (TMP) and 0.12 g of yttrium triflate catalyst (20 ppm, relative to the quantity of propoxylated starter compound to be produced) are introduced under protective gas (nitrogen) into a 10 liter glass pressure flask and heated to 130° C. while being stirred. 4161 g of propylene oxide are then apportioned by means of a membrane pump at 130° C. and a total pressure of 1.5 bar. Once the propylene oxide has been completely apportioned and after 5 hours' post-reaction time at 130° C., volatile fractions are removed by distillation at 105° C. (1 mbar) and the temperature is then reduced to room temperature.

The resultant propoxylated starter compound is a colourless oil having an OH value of 365 mg of KOH/g.

Stage B
Production of Long-chain Polyether Polyol from the Oligomeric, Propoxylated Starter Compound by Means of DMC Catalysis 460 g of the propoxylated starter compound from stage A and 0.12 g of DMC catalyst (20 ppm, relative to the quantity of long-chain polyol to be produced) are introduced under protective gas (nitrogen) into a 10 liter glass pressure flask and heated to 105° C. while being stirred. Propylene oxide (approx. 50 g) is then apportioned in a single portion until the total pressure has risen to 1.5 bar. No further propylene oxide is. apportioned until an accelerated pressure drop is observed. This accelerated pressure drop indicates that the catalyst is activated. The remaining propylene oxide (5490 g) is then continuously apportioned at a constant total pressure of 1.5 bar. Once the propylene oxide has been completely apportioned and after 5 hours' post-reaction time at 105° C., volatile fractions' are removed by distillation at 105° C. (1 mbar) and the temperature is then reduced to room temperature.

The resultant long-chain polyether polyol has an OH value of 28.5 mg of KOH/g and a double bond content of 7 mmol/kg.

The induction time was determined from the time/conversion curve (propylene oxide consumption [g] against reaction time [min]) from the intersection of the tangent at the steepest point of the time/conversion curve with the extended base line of the curve.

The propoxylation time corresponds to the period between catalyst activation (end of induction period) and the end of propylene oxide apportionment.

The total reaction time is the sum of induction and propoxylation times.

| | |
|---|---|
| Induction time: | 180 min |
| Propoxylation time: | 240 min |
| Total reaction time: | 420 min |

Comparative Example 2

Production of long-chain polyether polyol by means of DMC catalysis from oligomeric, propoxylated starter compound, which was obtained by KOH catalysis and conventional working up (removal of catalyst by means of neutralisation and filtration).

As Example 1, stage B, but with:

initial introduction of 437 g of a poly(oxypropylene)triol having an OH value of 380 mg of KOH/g (produced from trimethylolpropane and propylene oxide by KOH catalysis and conventional working up)

apportionment of a total of 5563 g of propylene oxide.

The resultant long-chain polyether polyol has an OH value of 29.3 mg of KOH/g and a double bond content of 6 mmol/kg.

| | |
|---|---|
| Induction time: | 240 min |
| Propoxylation time: | 555 min |
| Total reaction time: | 795 min |

Example 3

Stage A
Production of Oligomeric, Propoxylated Starter Compound by Means of Yttrium Triflate Catalysis 2627 g of trimethylolpropane (TMP) and 0.12 g of yttrium triflate catalyst (20 ppm, relative to the quantity of propoxylated starter compound to be produced) are introduced under protective gas (nitrogen) into a 10 liter glass pressure flask and heated to 130° C. while being stirred. 3373 g of propylene oxide are then apportioned by means of a membrane pump at 130° C. and total pressure of 1.5 bar. Once the propylene oxide has been completely apportioned and after 5 hours' post-reaction time at 130° C., volatile fractions are removed by distillation at 105° C. (1 mbar) and the temperature is then reduced to room temperature.

The resultant propoxylated starter compound is a colourless oil having an OH value of 538 mg of KOH/g.

Stage B
Production of Long-chain Polyether Polyol from the Oligomeric, Propoxylated Starter Compound by Means of DMC Catalysis 324 g of the propoxylated starter compound from stage A and 0.18 g of DMC catalyst (30 ppm, relative to the quantity of long-chain polyol to be produced) are introduced under protective gas (nitrogen) into a 10 liter glass pressure flask and heated to 105° C. while being stirred. Propylene oxide (approx. 30 g) is then apportioned in a single portion until the total pressure has risen to 1.5 bar. No further propylene oxide is apportioned until an accelerated pressure drop is observed. This accelerated pressure drop indicates that the catalyst is activated. The remaining propylene oxide (5646 g) is then continuously apportioned at a constant total pressure of 1.5 bar. Once the propylene oxide has been completely apportioned and after 5 hours' post-reaction time at 105° C., volatile fractions are removed by distillation at 105° C. (1 mbar) and the temperature is then reduced to room temperature.

The resultant long-chain polyether polyol has an OH value of 29.8 mg of KOH/g and a double bond content of 6 mmol/kg.

| Induction time: | 390 min |
|---|---|
| Propoxylation time: | 405 min |
| Total reaction time: | 795 min |

Comparative Example 4

Production of long-chain polyether polyol by means of DMC catalysis from oligomeric, propoxylated starter compound, which was obtained by KOH catalysis and conventional working up.

As Example 3, stage B, but with:
initial introduction of 316 g of a poly(oxypropylene)triol having an OH value of 550 mg of KOH/g (produced from trimethylolpropane and propylene oxide by KOH catalysis and conventional working up) After initial apportionment of approx. 30 g of propylene oxide up to a total pressure of 1.5 bar, no pressure drop occurred over a period of 22 hours, i.e. the catalyst is not activated.

Examples 1 and 3 show that oligomeric, propoxylated starter compounds are obtained by catalysis with the metal perfluoroalkylsulfonates described in DE-A 197 02 787 at very low catalyst usage rates (20 ppm) from conventional, low molecular weight starters (for example propylene glycol, trimethylolpropane) by reaction with propylene oxide, which oligomeric, propoxylated starter compounds may be directly converted, i.e. without working up and removal of catalyst, by means of highly active DMC catalysts at very low catalyst usage rates ($\leq$30 ppm) by reaction with propylene oxide into long-chain polyether polyols. Using the process according to the invention, it is thus possible to produce long-chain polyether polyols entirely without working up.

A comparison of Example 1 and Comparative Example 2 shows that when the oligomeric, propoxylated starter compounds obtained by catalysis with the metal perfluoroalkylsulfonates are used, the induction and propoxylation times on DMC catalysis are distinctly shortened in comparison with the use of corresponding starter compounds which were produced by KOH catalysis and conventional working up (neutralisation, filtration, dehydration). In the process according to the invention, this shortens the total reaction times of DMC catalysis by some 50%.

What is claimed is:

1. A method for producing long-chain polyether polyols without reprocessing, comprising:

(i) obtaining at least one oligomeric, alkoxylated starter compound by reacting:
        (a) at least one starter compound having a number average molecular weight of from about 18 to about 400 and further comprising from 1 to 8 hydroxyl groups with;
        (b) at least one alkylene oxide in the presence of;
        (c) from about 5 to about 200 ppm, relative to the amount of oligomeric, alkoxylated starter compound to be produced, a catalyst comprising a perfluoroalkylsulfonate of a metal of group III A of the Periodic System of Elements (IUPAC convention of 1970);
        (d) at a reaction temperature of from about 80° C. to about 200° C.;
    (ii) converting the oligomeric, alkoxylated starter compound into a long-chain polyether polyol without removal of the catalyst by reacting:
        (a) the oligomeric, alkoxylated starter compound with;
        (b) at least one alkylene oxide in the presence of;
        (c) at least one DMC catalyst, wherein the concentration of DMC catalyst is from about 30 ppm or less relative to the amount of long-chain polyether polyol to be produced.

2. The method of claim 1, in which the perfluoroalkylsulfonate is a triflate.

3. The method of claim 2, wherein the triflate is a triflate of scandium, yttrium, lanthanum, cerium, praseodymiun, neodymium, samarium, europium, gadolinium, terbium, dysprosium, holmium, erbium, thulium, ytterbium, or lutetium or mixtures thereof.

4. The method of claim 1, wherein the starter compound is ethylene glycol, diethylene glycol, triethylene glycol, 1,2-propylene glycol, dipropylene glycol, 1,4-butanediol, hexamethylene glycol, bisphenol A, trimethylolpropane, glycerol, pantaerythritol, sorbitol, cane sugar, degraded starch, or water or mixtures thereof.

5. The method of claim 1, wherein the reaction temperature in step (i)(d) is from about 90° C. to about 180° C.

6. The method of claim 1, wherein the concentration of the perfluoroalkylsulfonate in step (i)(c) is from about 5 to about 100 ppm.

7. The method of claim 1, wherein the reaction temperature in step (i)(d) is from about 100° C. to about 160° C.

8. The method of claim 1, wherein the concentration of the perfluoroalkylsulfonate in step (i)(c) is from about 10 to about 50 ppm.

* * * * *

UNITED STATES PATENT AND TRADEMARK OFFICE
CERTIFICATE OF CORRECTION

PATENT NO.    : 6,482,993 B1
DATED         : November 19, 2002
INVENTOR(S)   : Jorg Hofmann et al.

It is certified that error appears in the above-identified patent and that said Letters Patent is hereby corrected as shown below:

Column 2,
Line 29, after the word "polyols" but before the words "this manner", delete the word "It" and insert -- In --.

Column 3,
Line 19, after the word "following" but before the words "are preferably used" insert -- metals --.
Line 19, after the words "are preferably used" but before the ":" insert -- as triflates --.
Line 21, after the word "ytterbium", delete the word "and" and insert -- or --.
Line 22, after the word "lutetium", delete the word "triflate" and insert -- or mixtures thereof --.

Signed and Sealed this

Eighteenth Day of October, 2005

JON W. DUDAS
*Director of the United States Patent and Trademark Office*